United States Patent
Kurokawa et al.

(10) Patent No.: US 7,881,718 B2
(45) Date of Patent: Feb. 1, 2011

(54) WIRELESS COMMUNICATION SYSTEM, HANDOVER SUPPRESSION APPARATUS, STATION, COMMUNICATION CONTROL METHOD AND COMPUTER-READABLE MEDIUM STORING COMMUNICATION CONTROL PROGRAM

(75) Inventors: Hideki Kurokawa, Tokyo (JP); Kenichi Yasuma, Tokyo (JP); Hatsuho Murata, Tokyo (JP)

(73) Assignee: NEC Infrontia Corporation, Kawasaki, Kanagawa (JP)

( * ) Notice: Subject to any disclaimer, the term of this patent is extended or adjusted under 35 U.S.C. 154(b) by 768 days.

(21) Appl. No.: 11/822,742

(22) Filed: Jul. 9, 2007

(65) Prior Publication Data
US 2008/0014945 A1 Jan. 17, 2008

(30) Foreign Application Priority Data
Jul. 10, 2006 (JP) .............................. 2006-189848

(51) Int. Cl.
*H04W 36/00* (2009.01)
(52) U.S. Cl. ........................................ 455/436; 455/46
(58) Field of Classification Search ...... 455/569.1–573, 455/556.1–557, 436–444, 46
See application file for complete search history.

(56) References Cited

U.S. PATENT DOCUMENTS

| 6,445,936 | B1 * | 9/2002 | Cannon et al. | 455/573 |
| 2007/0082688 | A1 * | 4/2007 | Tu et al. | 455/515 |
| 2007/0183402 | A1 * | 8/2007 | Bennett et al. | 370/352 |

FOREIGN PATENT DOCUMENTS

JP 2005-184729 7/2005

\* cited by examiner

*Primary Examiner*—Jinsong Hu
*Assistant Examiner*—Michael Nguyen
(74) *Attorney, Agent, or Firm*—McGinn IP Law Group, PLLC

(57) ABSTRACT

When a station is connected via a connector to an AC adapter, a controller may detect the event of connection between the station and the adapter and drive a suppression signal transmitter to send a suppression signal to suppress a handover by the station. The station may include a communication controller to fix, upon receipt of the suppression signal from the adapter, a wireless access point to which the station belongs. The station may enter a handover suppressed state in which the station does not conduct a handover to belong to another wireless access point so long as the station is connected to the adapter and is receiving the suppression signal. This may suppress the excessive handover and secure stable communication quality.

25 Claims, 9 Drawing Sheets

F I G. 1
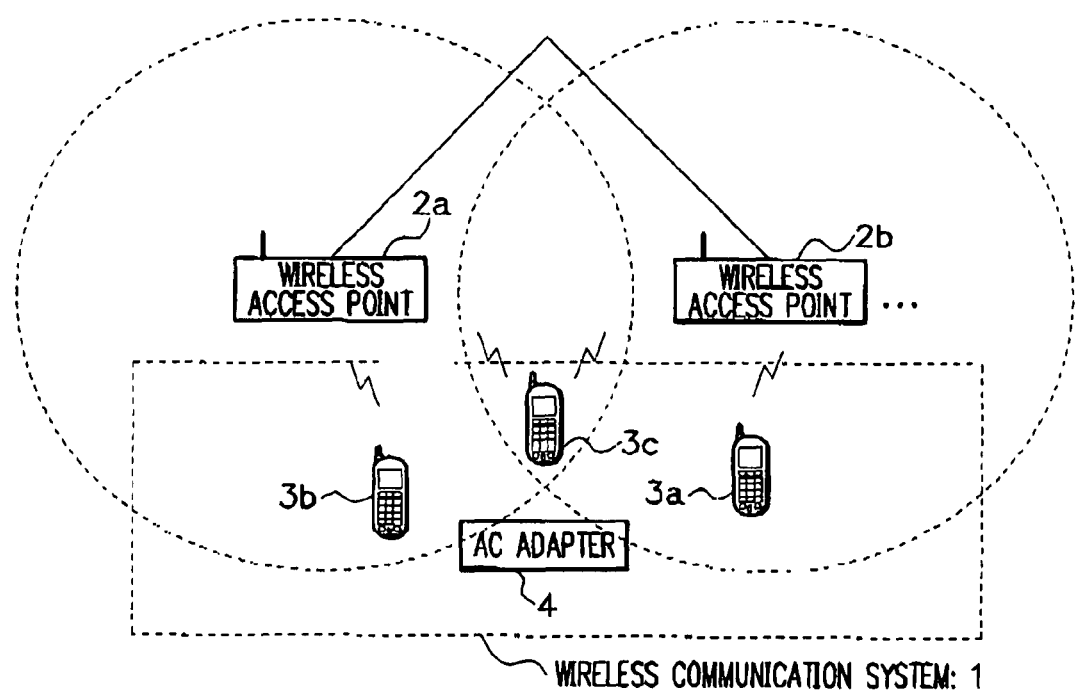

F I G. 2
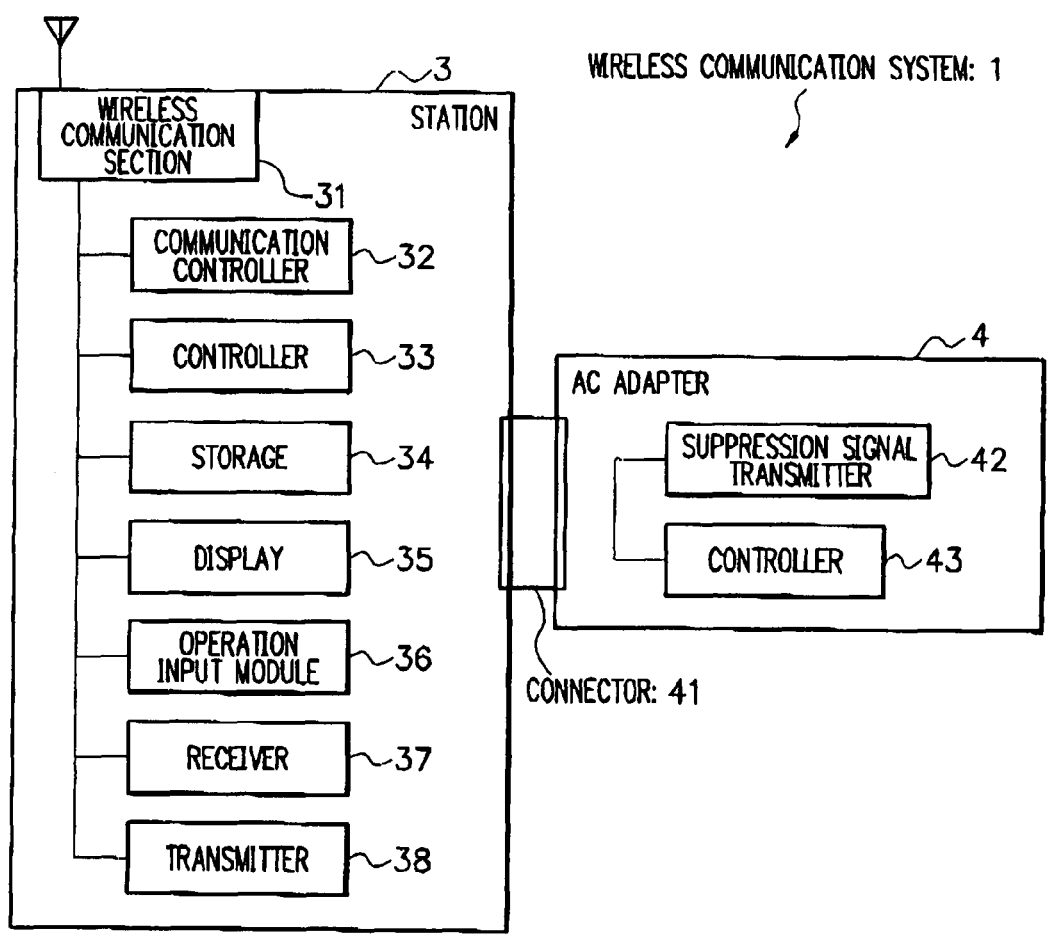

F I G. 4
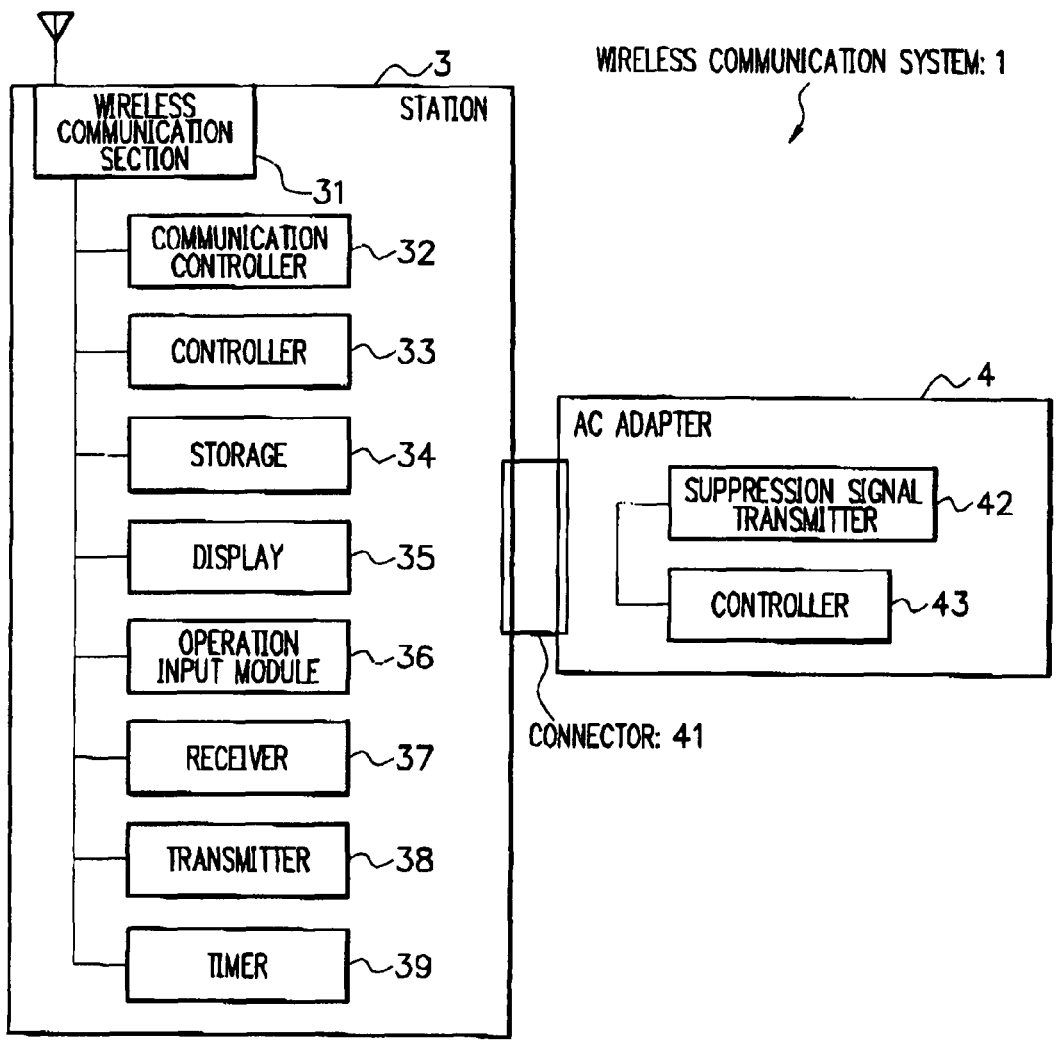

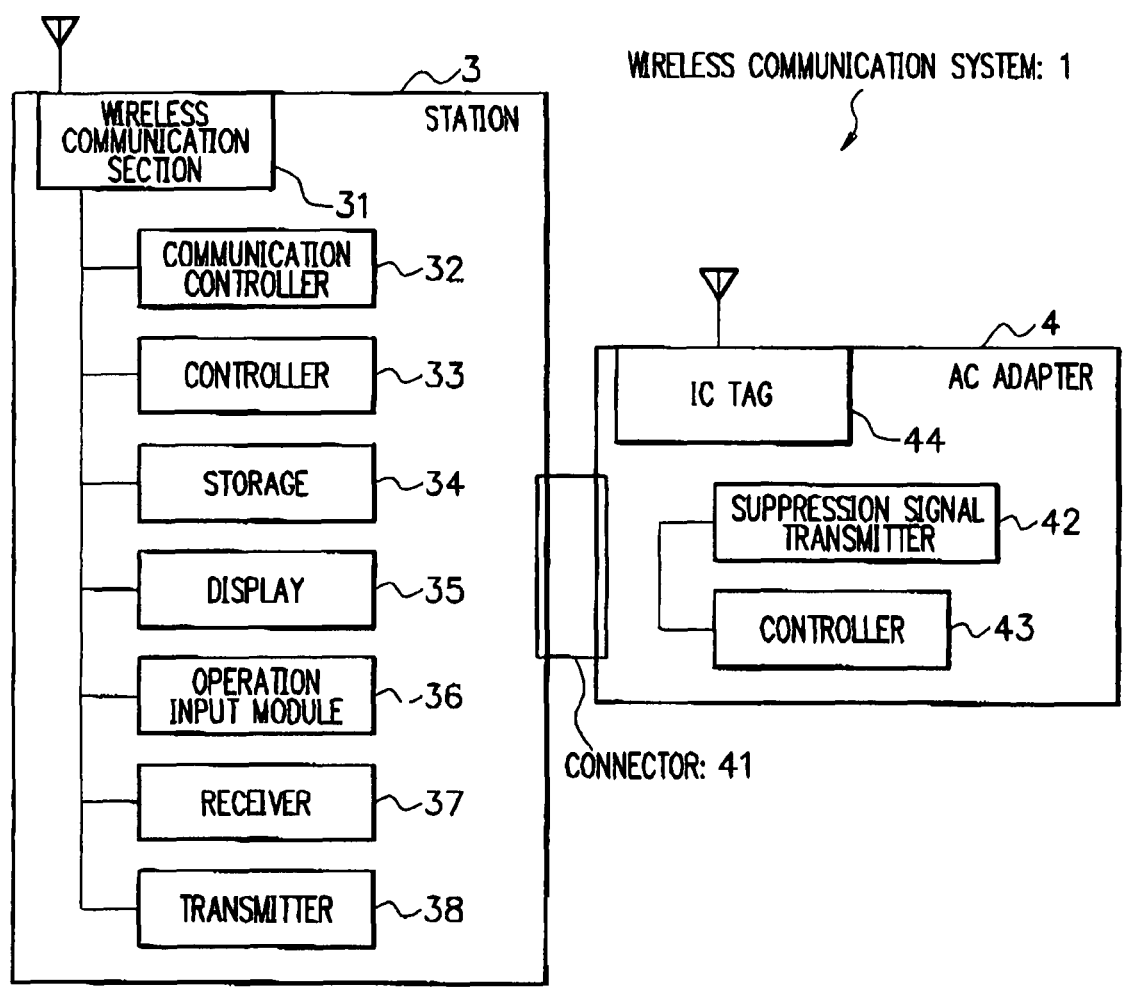
F I G. 6

WIRELESS COMMUNICATION SYSTEM, HANDOVER SUPPRESSION APPARATUS, STATION, COMMUNICATION CONTROL METHOD AND COMPUTER-READABLE MEDIUM STORING COMMUNICATION CONTROL PROGRAM

This application is based upon and claims the benefit of priority from Japanese patent application No. 2006-189848, filed on Jul. 10, 2006, the disclosure of which is incorporated herein in its entirety by reference.

BACKGROUND OF THE INVENTION

1. Field of the Invention

The present invention pertains to a wireless communication system, a handover suppression apparatus, a station, a communication control method, and a computer-readable medium storing a communication control program in which a wireless communication terminal or a station conducts a handover of a wireless base station or access point to which the station belongs, according to a condition of radio wave in wireless communication with the wireless access point.

2. Description of the Related Art

In general, in an environment of a wireless communication system in which a station is connectible to wireless access points, the station determines a wireless access point to which the station belongs and then sends a belonging request.

There existed a wireless communication system including a position detector connected to a network and a roaming determining device to determine whether the wireless access point connected to a cellular phone is to be changed. In this system, the cellular phone changes the own cell Identifier (ID) according to an instruction from the roaming determining device to thereby conduct the roaming operation (reference is to be made to, for example, Japanese Patent Application Laid-Open No. 2005-184729 (document 1)).

Description will now be given of problems of the conventional techniques.

If the conventional wireless communication system is operated in an environment in which at least one wireless access point is installed in a small and narrow area, for example, a house or a building, if a wireless communication terminal or a station exists in the vicinity of a boundary between cover areas respective of adjacent wireless access points, there exists a tendency that the handover excessively, i.e., frequently, occurs in association with a slight movement and/or depending on the direction of the station as well as the condition of radio wave. This possibly deteriorates communication quality due to such frequent handover.

The technique described in document 1 requires operation in which a server dedicated to the roaming is connected to the network so that the position of the station is detected to determine the necessity of roaming. Moreover, the position detection and the determination of the necessity of roaming disadvantageously lead to occurrence of wireless communication traffic.

SUMMARY OF THE INVENTION

An exemplary object of the invention is to provide a wireless communication system, a handover suppression apparatus, a station, a communication control method, and a computer-readable medium storing a communication control program to suppress the excessive handover and establish connections with stable communication quality without necessitating any expensive server device and without increasing the wireless communication traffic.

[Wireless Communication System]

A wireless communication system according to an exemplary aspect of the invention includes a station capable of conducting wireless communication with a wireless access point and a handover suppression apparatus connectable (e.g. removably connected) to the station. The handover suppression apparatus includes a suppression signal transmitting module that transmits a suppression signal to suppress a handover by the station. The station includes a communication control module that conducts, upon receipt of the suppression signal from the suppression signal transmitting module, a control operation to fix a wireless access point to which the station belongs, without conducting a handover.

[Handover Suppression Apparatus]

A handover suppression apparatus according to an exemplary aspect of the invention is connectable (e.g., removably connected) to a station capable of conducting wireless communication with a wireless access point. The apparatus includes a handover suppression signal transmitting module that transmits a suppression signal to suppress a handover by the station.

[Station]

A station according to an exemplary aspect of the invention is configured to be connectible to a handover suppression apparatus, the station being capable of conducting wireless communication with a wireless access point. The station includes a communication control module that conducts, at reception of a suppression signal to suppress a handover from the suppression signal transmitting module, a control operation to fix a wireless access point to which the station belongs, without conducting a handover.

[Communication Control Method]

A communication control method for a wireless communication system according to an exemplary aspect of the invention includes a station capable of conducting wireless communication with a wireless access point and a handover suppression apparatus connectable (e.g., removably connected) to the station. The method includes the suppression signal transmitting step of transmitting by the handover suppression apparatus a suppression signal to suppress a handover by the station and the belonging unit fixing step of conducting by the station, at reception of the suppression signal transmitted from the suppression signal transmitting step, an operation to fix a wireless access point to which the station belongs, without conducting a handover.

[Computer-Readable Medium Storing Communication Control Program]

A computer-readable medium storing a communication control program for a wireless communication system according to an exemplary aspect of the invention includes a station capable of conducting wireless communication with a wireless access point and a handover suppression apparatus connectable (e.g., removably connected) to the station. The program causes a computer to perform processing for transmitting a suppression signal to suppress a handover by the station, and processing for conducting, at reception of the suppression signal transmitted from the suppression signal transmitting step, an operation to fix a wireless access point to which the station belongs, without conducting a handover.

BRIEF DESCRIPTION OF THE DRAWINGS

Features of the disclosed embodiments will be described by way of the following detailed description with reference to the accompanying drawings in which:

FIG. 1 is a schematic block diagram showing a configuration example of a wireless communication system, according to an exemplary aspect of the invention;

FIG. 2 is a block diagram showing an example of structure of a station 3 with an Alternating Current (AC) adapter 4, according to an exemplary aspect of the invention;

FIG. 4 is a block diagram showing an example of structure of the station 3 with an AC adapter 4, according to an exemplary aspect of the invention;

FIG. 6 is a block diagram showing a configuration example of the station 3 with an AC adapter 4, according to an exemplary aspect of the invention;

DESCRIPTION OF EXEMPLARY EMBODIMENTS

Figure 3:
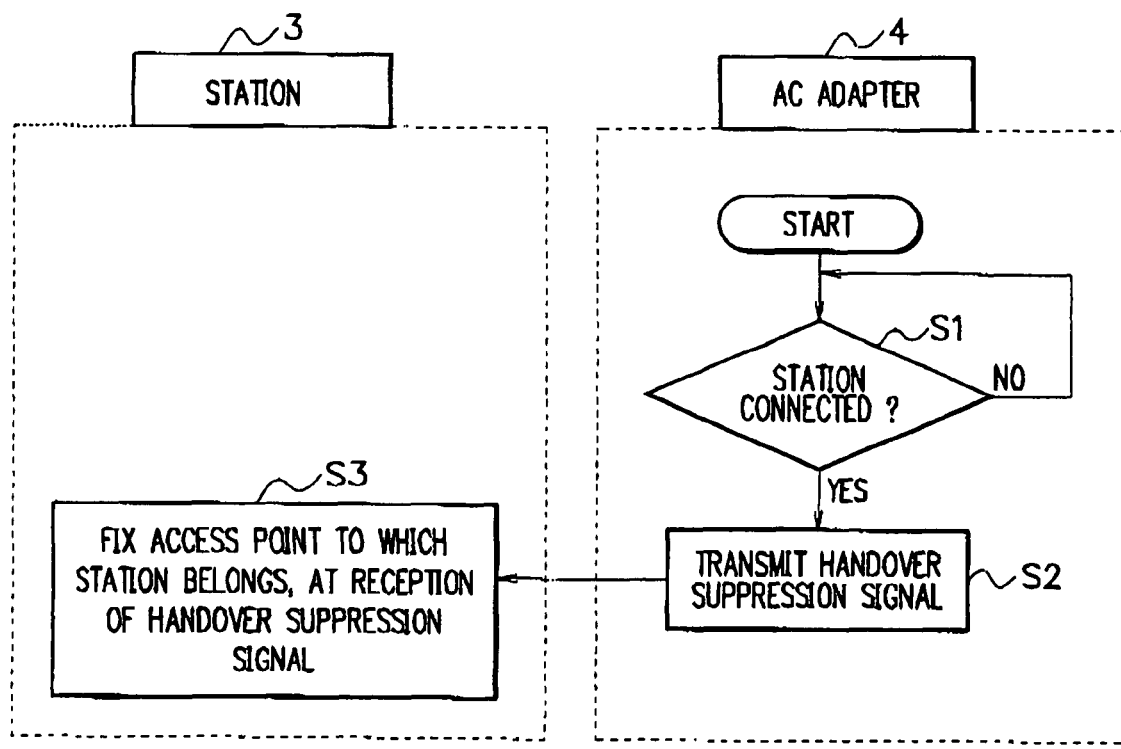
FIG. 3 is a flowchart showing an operation example of a wireless communication system, according to an exemplary aspect of the invention.

Referring next to the drawings, description will be given in detail of some exemplary aspects of the invention, including a wireless communication system in which handover suppression is conducted using an AC adapter, the system including a wireless communication system, a handover suppression apparatus, a station, a communication control method, and a computer-readable medium storing a communication control program.

First Exemplary Embodiment

A wireless communication system 1 may include a station 3 (e.g., at least one station) which may be wirelessly communicable with a wireless access point (e.g., access points 2a, 2b, etc.). The system 1 may also include an alternating current (AC) adapter 4 (e.g., a handover suppression device) which is connectable (e.g., removably connected) to the station 3 to charge the station 3 as shown in FIG. 1.

An access point (e.g., each of the access points 2) may control connection of wireless communication for the station 3. Access points 2 (2a, 2b, ...) may also be connected to each other to form a network.

An outline of the first exemplary embodiment will be given.

In the example shown in FIG. 1, when the stations 3 (3a, 3b, 3c) are separated from the AC adapter 4, the stations 3a and 3b belong respectively to the access points 2b and 2a in a stable state.

However, the station 3c is near the boundary between the cover areas respectively of the access points 2a and 2b. Therefore, for example, if the position or direction of the station 3c slightly changes in a hand of the user, there possibly occurs a handover to select an access point to which the station 3c newly belongs.

The handover of this type is an excessive handover when the user, unmoving, operates the station 3, for example, near his or her desk. This disadvantageously makes communication quality unstable.

In this exemplary embodiment, the AC adapter 4, usually placed near the user together with the station, includes a handover suppression function to suppress the excessive handover to thereby guarantee stable communication quality.

Next, description will be given of structure of the constituent devices of the wireless communication system 1.

As can be seen from FIG. 2, the station 3 (e.g., stations 3a, 3b, 3c, etc.) may include: a wireless communication module 31 to conduct wireless communication with, for example, the access point 2; a communication controller 32 to control communication, for example, to determine an access point to which the associated station belongs for wireless communication by the communication module 31; a control module 33 to supervise the overall operation of the station 3; a storage module 34; a display 35 to display various information items; an operation input module 36 to receive operation input items from the user; and a receiver 37 and a transmitter 38 to conduct a call by voice and sound.

The AC adapter 4 may include, as shown in FIG. 2, a connector 41 to connect to a station 3, a suppression signal transmitter 42 to produce a suppression signal to suppress the handover, and a controller 43 to supervise the overall operation of the adapter 4. The adapter 4 may be configured to charge the station 3.

Referring next to FIG. 3, description will be given of an operation of the wireless communication system 1.

When the station 3 is linked via the connector 41 with the AC adapter 4 (yes in step S1), the controller 43 may detect the connection thus established (connection detection) and drive the transmitter 42 to produce a suppression signal to suppress the handover of the station 3 (step S2).

When the station 3 is coupled via the connector 41 with the adapter 4, the station 3 may start an operation to charge a power source which may be integrally installed in the station 3. Therefore, the suppression signal from the transmitter 42 may be delivered to the station 3 through a wiring arrangement that may also be used as the power supply line.

When the suppression signal is received from the adapter 4, the controller 32 of the station 3 may fix the access point 2 to which the station 3 is currently belonging. So long as the station 3 is connected to the adapter 4 and is receiving the suppression signal, the station 3 may be kept in a handover suppressed state in which the handover to another access point is prevented (step 3).

When the station 3 is thereafter disconnected from the connector 41 of the adapter 4, the suppression signal reception from the adapter 4 may be interrupted. Therefore, the controller 32 may release the handover suppressed state, and the wireless communication section 31 may start the ordinary control operation for the wireless communication.

According to this exemplary embodiment, it is possible to suppress the excessive occurrence of the handover while the station 3 is connected to the adapter 4 and the user operates the station 3 without changing his or her location.

While the station 3 is connected to the adapter 4, a call addressed to the station 3 may be delivered via the access point to which the station 3 fixedly belongs. This makes it possible to conduct the call by voice with stable communication quality.

For example, it is possible to prevent the occurrence of the excessive handover in a situation in which the AC adapter 4 is placed on a user's desk or nearby and the user is operating the station 3 at the desk.

Even if communication is not conducted wirelessly, exemplary advantages described above may be obtained so long as the user connects the station 3 to the connector 41.

As above, when the station is connected to the AC adapter, it may be possible to suppress occurrence of the excessive handover to thereby secure stable communication quality.

Second Exemplary Embodiment

Description will now be given of a second exemplary embodiment.

In this exemplary embodiment, the station 3 may include, in addition to the configuration of the first exemplary embodiment, a timer section to measure time. Based on the time period measured by the timer section, a handover suppressed state may be controlled where the belonging relationship between a station and an associated access point is fixed.

Description of the same components as those of the first exemplary embodiment will be avoided.

Referring to FIG. 4, description will be given of the station 3.

The station 3 may include a timer module 39 in addition to the configuration of the first exemplary embodiment.

The timer module 39 may measure a connection period of time during which the station 3 is kept connected to the AC adapter 4 and a disconnection period of time starting from when the station 3 is disconnected from the adapter 4.

Figure 5:
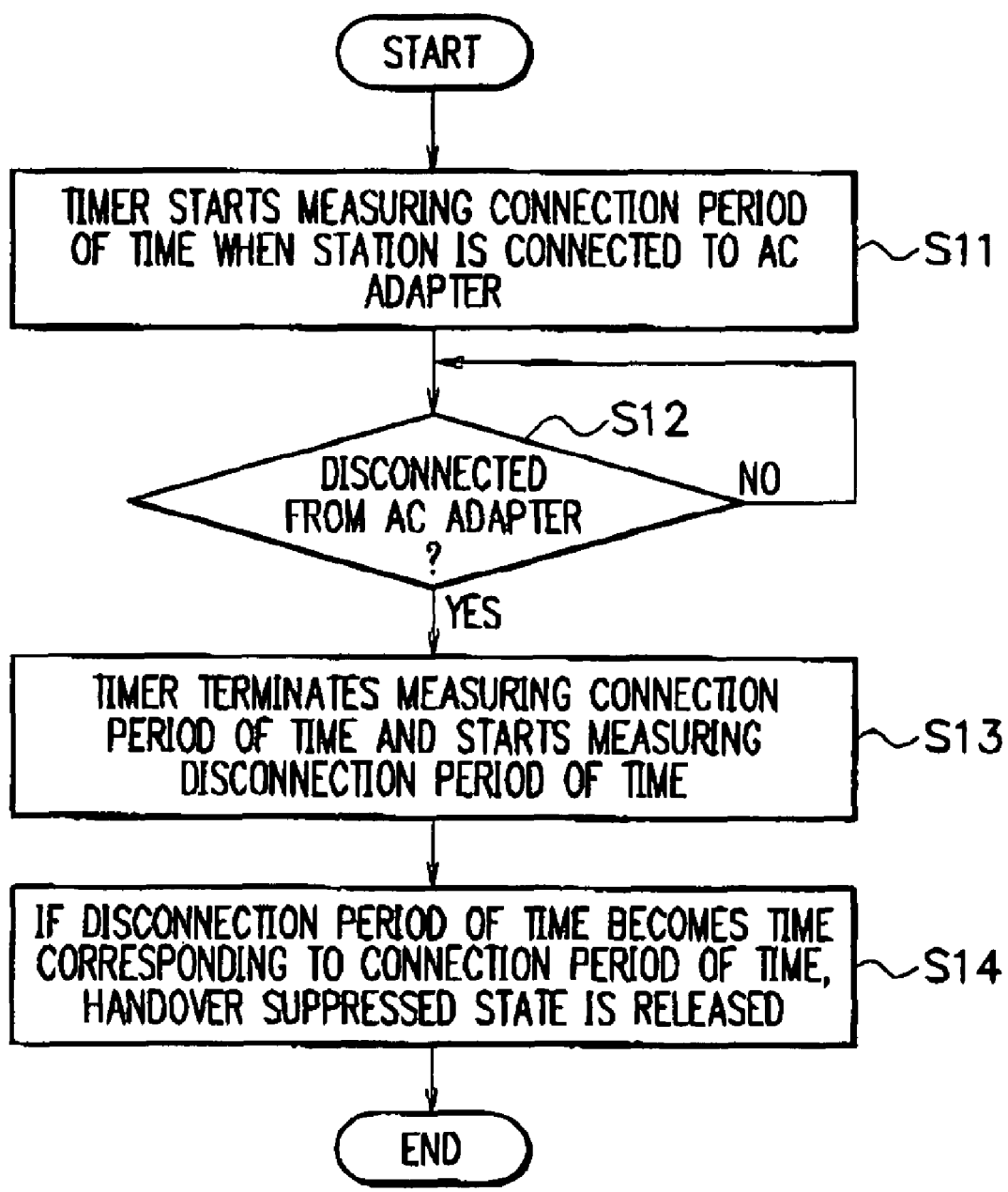
FIG. 5 is a flowchart showing an operation to release a handover suppressed state of a wireless communication system, according to an exemplary aspect of the invention.

Referring next to FIG. 5, description will be given of the wireless communication system.

The station is first linked via the connector 41 with the AC adapter 4. As in the first exemplary embodiment, the controller 43 may detect the connected state and the suppression signal transmitter 42 may issue a suppression signal In response thereto, the station 3 may enter the handover suppressed state to fix the associated access point.

Simultaneously, the timer 39 may start measuring the connection period of time in which the station 3 is connected to the adapter 4 (step S11).

Thereafter, when the station 3 is disconnected from the connector 41 of the adapter 4 (yes in step S12), the timer module 39 may terminate the measuring of the connection period initiated in step S11 and then start measuring the disconnection period of time (step S13). The handover suppressed state initiated when the station 3 is connected to the adapter 4 may be kept unchanged.

When the disconnection period measured starting at disconnection of the station 3 from the connector 41 of the adapter 4 reaches a state release period of time beforehand determined in association with the connection period of time measured up to step S13, the controller 32 of the station 3 may release the handover suppressed state (step S14).

It is assumed that the state release period time described above may be set in proportion to the connection period of time. The longer the connection period of time is, the longer the state release period time may be. The shorter the connection period of time is, the shorter the state release period of time may be.

When the handover suppressed state is released, the controller 32 may start conducting the ordinary wireless communication control of the wireless communication section 31.

In accordance with the second exemplary embodiment, advantages as in the first exemplary embodiment may be obtained, Moreover, the timer module 39 may measure the connection period of time and the disconnection period of time. Therefore, according to the connection period of time in which the station 3 is coupled with the AC adapter 4, it may be possible to retain the handover suppressed state after the station 3 is separated from the adapter 4, without disturbing the ordinary communication.

It may therefore be guaranteed even after the station 3 is disconnected from the adapter 4 that the communication may be carried out without causing any unnecessary handover, and hence the stable communication quality is secured.

Third Exemplary Embodiment

Description will now be given of a third exemplary embodiment.

In the third exemplary embodiment, the AC adapter 4 may include, in addition to the constituent elements of the first exemplary embodiment, an Integrated Circuit (IC) tag (e.g., a radio wave responder) 44 to send a reply radio wave in response to a radio wave from the station 3. Therefore, even after the station 3 is disconnected from the adapter 4, the handover suppressed state may be retained if the station 3 is within a predetermined distance from the adapter 4.

Description of the same constituent components as those of the first exemplary embodiment will be omitted.

Referring to FIG. 6, description will be given of structure of the AC adapter.

The adapter 4 may include an IC tag 44 in addition to the configuration of the first exemplary embodiment.

The IC tag 44 may include an antenna to receive a radio wave emitted from the station 3. If it is determined that the radio wave has been sent from the station 3, the IC tag 44 may emit a reply radio wave with predetermined power.

Figure 7:
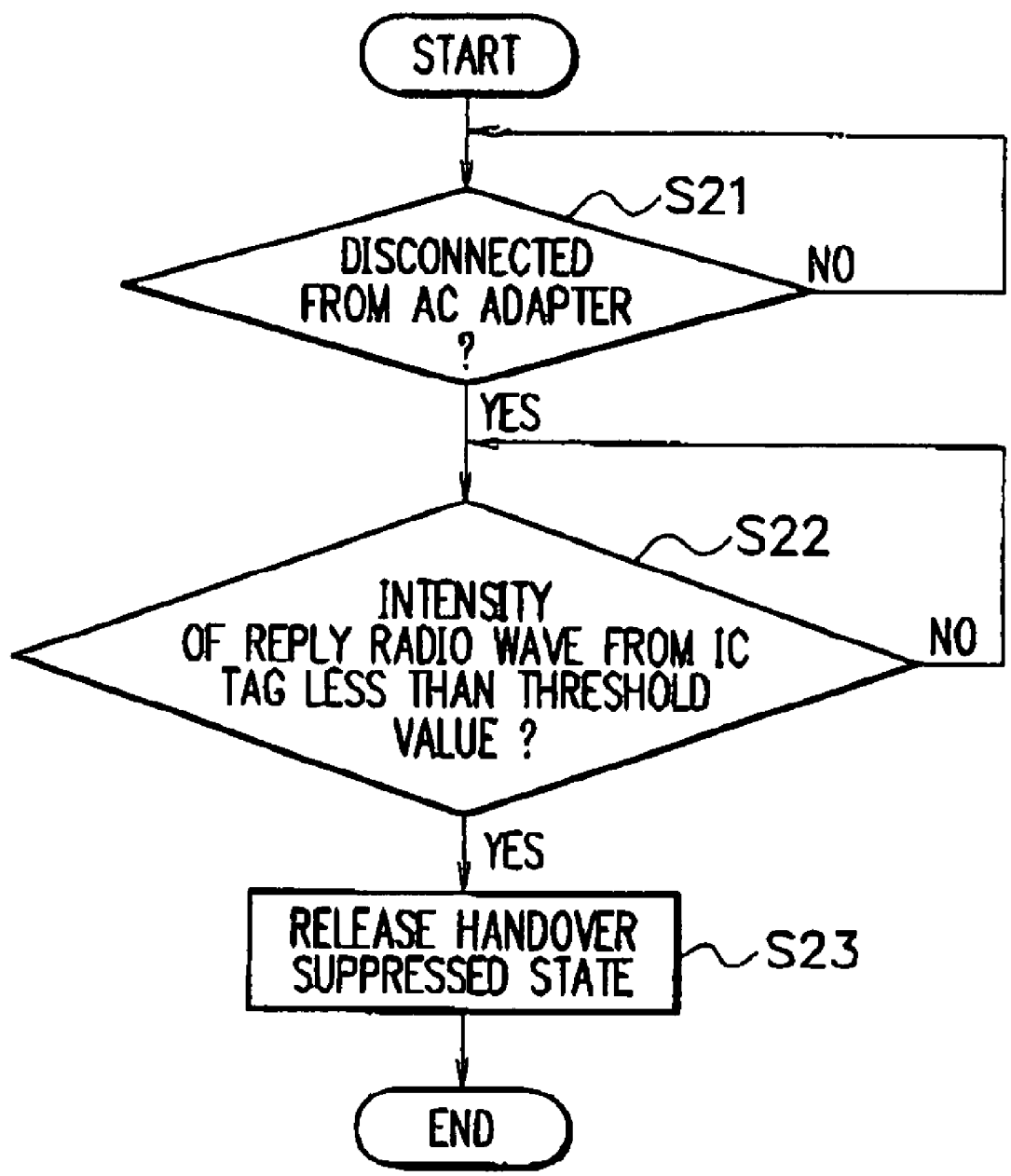
FIG. 7 is a flowchart showing an operation to release a handover suppressed state of a wireless communication system, according to an exemplary aspect of the invention.

Referring next to FIG. 7, description will be given of operation of a wireless communication system according to an exemplary aspect of the present invention.

When the station is coupled via the connector 41 with the AC adapter 4, the controller 43 detects, as in the first exemplary embodiment, the connected state, and the suppression signal transmitter 42 may issue a suppression signal. The station 3 may enter the handover suppressed state to fix the associated access point to which the station 3 belongs.

When the station 3 is separated from the connector 41 of the adapter 4 (yes in step S21), the communication module 31 of the station 3 may emit a radio wave including predetermined information.

If a reply radio wave is received from the IC tag 44 in response to the radio wave and the intensity of the reply radio wave is equal to or more than a predetermined threshold value, the communication controller 32 of the station 3 may keep the handover suppressed state initiated when the station 3 is connected to the adapter 4 (no in step S22).

After the station is separated from the connector 41 of the adapter 4, if it is detected that the intensity of the reply radio wave from the IC tag 44 is less than the predetermined threshold value (yes in step S22), the communication controller 32 of the station 3 may release the handover suppressed state (step S23).

After the handover suppressed state is released, the controller 32 may initiate conducting the ordinary wireless communication control of the wireless communication section 31.

In accordance with the third exemplary embodiment, advantages as in the first exemplary embodiment may be obtained. Additionally, even after the station 3 is disconnected from the adapter 4, the handover suppressed state can be retained so long as the intensity of the reply radio wave from the IC tag 44 is equal to or more than the threshold value.

Therefore, even after the station 3 is separated from the adapter 4, the communication may be conducted without causing any unnecessary handover so long as the station 3 is operated within a predetermined distance from the AC adapter 4. This consequently may secure the stable communication quality.

As the IC tag 44, various IC tags may be employed so long as the tag issues a reply radio wave with predetermined power in response to a radio wave from the station 3. For example, it is possible to use an active adapter that uses power from the AC adapter 4 and a passive adapter not requiring such power source. As for the electromagnetic wave transmission method of the IC tag, there may be adopted an electromagnetic induction scheme in which a coil of the tag is coupled by magnetic flux with an antenna coil of a reader of the tag. There may also be adopted a radio wave scheme in which electromagnetic waves are communicated between antennas of the tag and the reader.

Exemplary embodiments are not limited to the IC tag. That is, devices other than an IC tag may be employed, so long as the device issues a reply radio wave with predetermined power in response to a radio wave sent from the station 3. For example, there may be utilized a device in a configuration in which the AC adapter 4 includes a wireless communication module to emit a reply radio wave with predetermined power.

The embodiments described above are exemplary embodiments. The present invention is not restricted by the embodiments. It is to be understood that the embodiments can be changed and modified in various ways within the scope of the ideas of the present invention.

For example, in the description of the exemplary embodiments, the suppression signal via the connector 41 may be communicated via the wiring arrangement that is also employed as the power supply line. However, a suppression signal that is delivered from the AC adapter 4 to the station 3 may also suffice. For example, there may be disposed a wiring arrangement dedicated to communicate the handover suppression signal.

Although the suppression signal transmitter 42 may send the handover suppression signal when the station 3 is coupled via the connector 41 with the AC adapter 4 in the above description, the present invention is not restricted by those configurations. For example, as can be seen from FIG. 8, the AC adapter 4 may include a depression switch 45 (as an input device) such that when the switch 45 is pushed, the suppression signal transmitter 42 issues the suppression signal.

In the situation, the communication controller 32 may fix the belonging state at the point of time in which the station 3 belongs to the wireless access point 2 to thereby set the handover suppressed state. That is, so long as the station 3 is connected to the AC adapter 4 and is receiving the suppression signal, the handover to another wireless access point does not occur.

Figure 8:
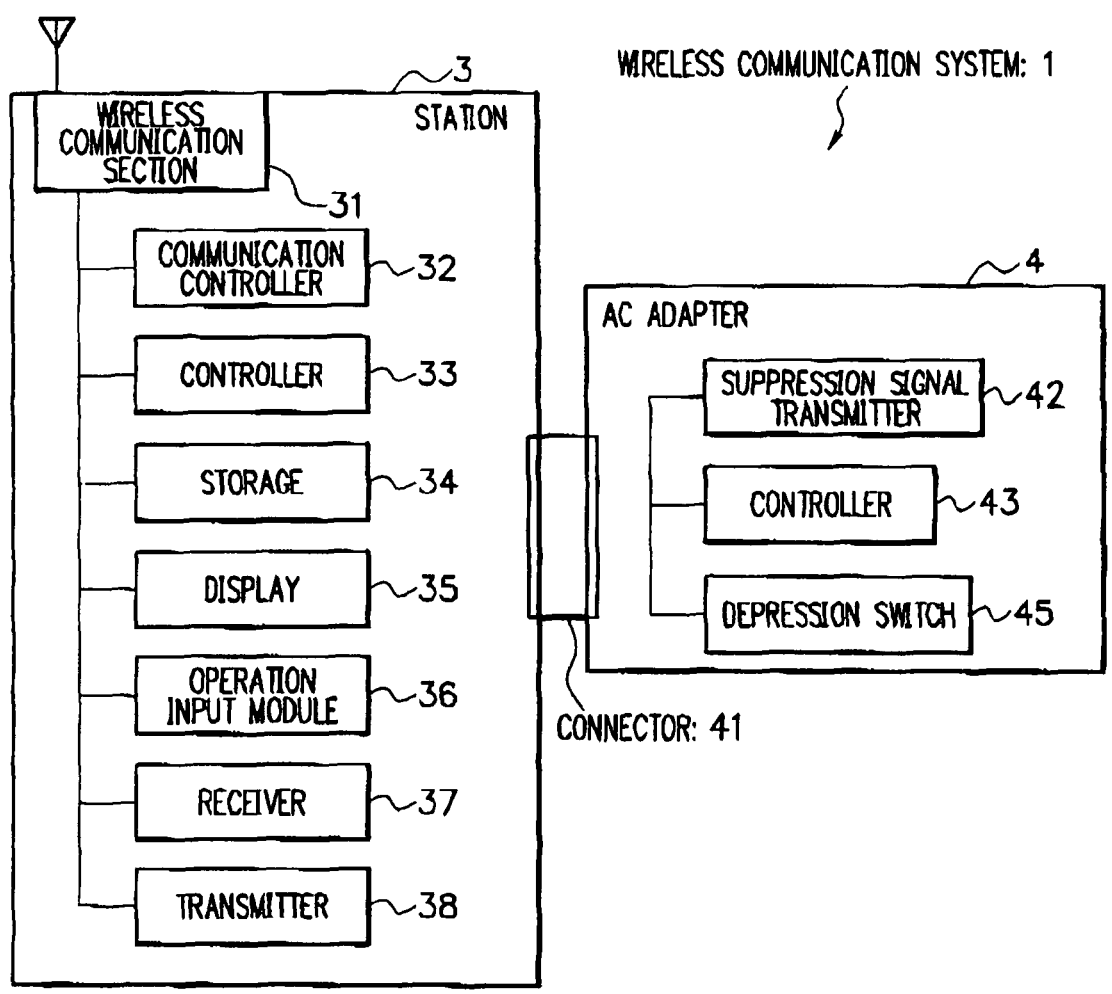
FIG. 8 is a block diagram showing a configuration example of the station 3 with an AC adapter 4, according to an exemplary aspect of the invention.

In the configuration including the depression switch 45 shown in FIG. 8, when the user recognizes, for example, the excessive handover, the wireless access point to which the station 3 belongs can be fixed at timing desired by the user to resultantly set the handover suppressed state. Therefore, the communication quality can be stabilized as the user desires.

In the description of the exemplary embodiments, when the handover suppression signal is received, the wireless access point 2 to which the station 3 is belonging may be fixed to thereby set the handover suppressed state. However, there may also be used a configuration in which the AC adapter 4 determines the wireless access point to which the station 3 belongs and then notifies the station 3 of the access point.

Figure 9:
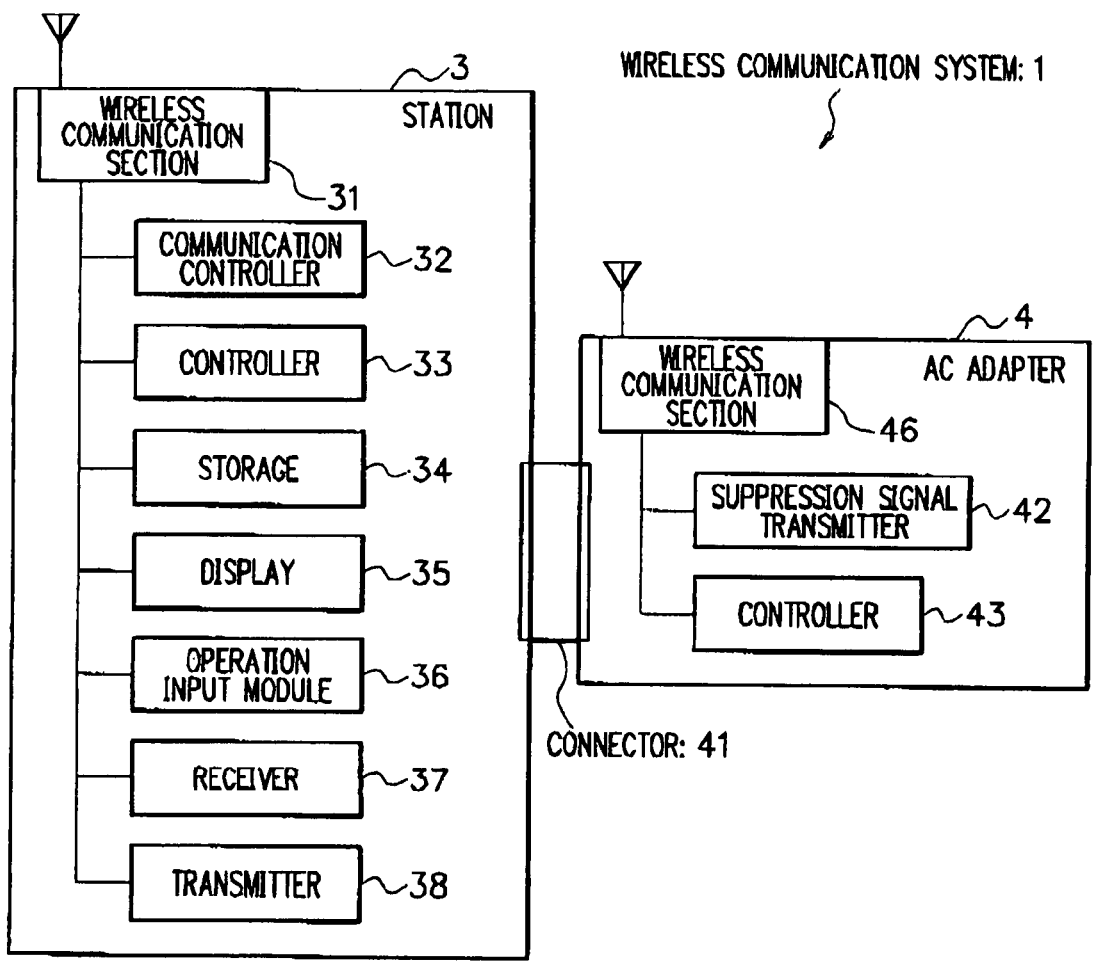
FIG. 9 is a block diagram showing a configuration example of the station 3 with an AC adapter 4, according to an exemplary aspect of the invention.

That is, as shown in the configuration example of FIG. 9, there may be used a wireless communication section 46 to detect wireless access points in its peripheral area. In this example, the controller 45 of the AC adapter 4 may make a check to determine whether the station 3 is wirelessly communicable with a plurality of wireless access points 2. If it is determined that the station 3 is wirelessly communicable with wireless access points 2, the controller 43 may deliver the suppression signal from the suppression signal transmitter 42 together with an access point designation signal to the station 3. The access point designation signal may indicate that the station 3 belongs to a wireless access point 2 determined on the basis of information obtained from the wireless communication section 46. The station 3 resultantly may fix the wireless access point 2 to which the station 3 belongs.

The controller 43 may send an access point designation signal to the station 3, the access point designation signal indicating that the station 3 belongs to a wireless access point beforehand determined, for example, by an operator's input section of the AC adapter 4. According to the designation signal, the station 3 may fix the wireless access point to which the station 3 belongs.

In the configurations in which the AC adapter 4 specifies by the access point designation signal the wireless access point to which the station belongs, it is possible to fix, according to the designation from the AC adapter 4, the access point to which the station belongs regardless of what the handover state of the station 3 is, and the wireless access point to which the station 3 belongs. This may lead to a more stable communication control operation.

The station in accordance with exemplary embodiments may be applicable to information processing devices including a wireless communication function, for example, a voice communication terminal such as a cellular phone conducting a call via Voice over IP (VoIP); an information communication terminal, for example, a Personal Digital Assistant (PDA), or a note Personal Computer (PC).

The processing procedure to implement each of the wireless communication system may be recorded as a program in a computer-readable medium. By using the program supplied from the computer-readable medium, the functions are performed by executing the program by a Central Processing Unit (CPU) of a computer constituting the system.

A group of information items including the program may be transferred to an output device via the computer-readable medium or via a network from an external recording medium.

In other words, the program code read from the computer-readable medium may achieve the novel functions of the present invention. The computer-readable medium having recorded program codes and signals attained from the computer-readable medium are also included in the scope of the present invention.

As the computer-readable medium, there may be adopted, for example, a floppy (registered trademark) disk, a hard disk, an optical disk, a magnetooptical disk, a Compact-Disk Read-Only Memory (CD-ROM), a CD-R, a magnetic tape, a non-volatile memory card, an ROM, or an Electrically Erasable Programmable ROM (EEPROM).

The respective functions of the wireless communication system may be implemented by a wireless communication system supervised by the program.

Fourth Exemplary Embodiment

It may be favorable that the handover suppression apparatus includes a connection detecting module that detects whether the station is connected to the connection detecting module and the suppression signal transmitting module transmits the suppression signal when the connection detecting module detects the connection between the station and the handover suppression apparatus.

Fifth Exemplary Embodiment

The handover suppression apparatus may include an input module that receives an input and the suppression signal transmitting module transmits the suppression signal when an input of handover suppression is received from the input module.

Sixth Exemplary Embodiment

The communication control module may desirably release, when the reception of the suppression signal is interrupted, a handover suppressed state wherein a wireless access point to which the station belongs is fixed.

Seventh Exemplary Embodiment

The station may include a timer that measures a connection period of time in which the station is connected to the handover suppression apparatus and a disconnection period of time passed after the station is disconnected from the handover suppression apparatus. It may be favorable in this situation that the communication control module holds a handover suppressed state wherein a wireless access point to which the station belongs is fixed, until the disconnection period of time measured by the timer is substantially equal to a period of time determined according to the connection period of time measured by the timer, even after the station is disconnected from the handover suppression apparatus.

Eighth Exemplary Embodiment

The handover suppression apparatus may include a radio wave responder for transmitting, at reception of a radio wave from the station, a reply radio wave in response to the radio wave. The communication control module may desirably hold a handover suppressed state wherein a wireless access point to which the station belongs is fixed, according to the reply radio wave from the radio wave responder, even after the station is disconnected from the handover suppression apparatus.

Ninth Exemplary Embodiment

It may be desirable that the communication control module holds a handover suppressed state wherein a wireless access point to which the station belongs is fixed, so long as the reply radio wave from the radio wave responder has intensity of radio wave equal to or more than a predetermined threshold value, even after the station is disconnected from the handover suppression apparatus, and releases the handover suppressed state when the intensity of radio wave is less than the threshold value.

Tenth Exemplary Embodiment

The handover suppression apparatus may desirably include a communication state judge module that determines whether the station is wirelessly communicable with wireless access points and a designation signal transmitting module that transmits, if the communication state judge module determines that the station is wirelessly communicable with wireless access points, an access point designation signal indicating a wireless access point to which the station belongs, The designation signal transmitting module may favorably transmit to the station, the access point designation signal together with the suppression signal produced from the suppression signal transmitting module.

Eleventh Exemplary Embodiment

It may be desirable that the handover suppression apparatus is connected to the station without using wireless communication as a transmission medium and transmits the suppression signal via the connection to the station.

Twelfth Exemplary Embodiment

The handover suppression apparatus may desirably include a power supply unit for supplying power to the station.

Thirteenth Exemplary Embodiment

It may be favorable that the handover suppression apparatus includes a connection detecting module that detects whether the station is connected to the handover suppression apparatus, and the suppression signal transmitting module transmits the suppression signal when connection detecting module detects the connection between the station and the handover suppression apparatus.

Fourteenth Exemplary Embodiment

The handover suppression apparatus may include an input module that receives an input, and the suppression signal transmitting module transmits the suppression signal when an input of handover suppression is received from the input module.

Fifteenth Exemplary Embodiment

The handover suppression apparatus may favorably include a communication state judge module that determines whether the station is wirelessly communicable with wireless access points and a designation signal transmitting module that transmits, if the communication state judge module determines that the station is wirelessly communicable with wireless access points, an access point designation signal indicating a wireless access point to which the station belongs. It may be favorable in this case that the designation signal transmitting module transmits to the station, the access point designation signal together with the suppression signal produced from the suppression signal transmitting module.

Sixteenth Exemplary Embodiment

The handover suppression apparatus may desirably include a radio wave responder that transmits, at reception of a radio wave from the station, a reply radio wave in response to the radio wave.

Seventeenth Exemplary Embodiment

The handover suppression apparatus may be desirably connected to the station without using wireless communication as a transmission medium and transmits the suppression signal via the connection to the station.

Eighteenth Exemplary Embodiment

The handover suppression apparatus may favorably include a power supply unit for supplying power to the station.

Nineteenth Exemplary Embodiment

It may be favorable that the communication control module releases, when the reception of the suppression signal is interrupted, a handover suppressed state wherein a wireless access point to which the station belongs is fixed.

Twentieth Exemplary Embodiment

The station may include a timer that measures a connection period of time in which the station is connected to the handover suppression apparatus and a disconnection period of time passed after the station is disconnected from the handover suppression apparatus. In the situation, the communication control module desirably holds a handover suppressed state wherein a wireless access point to which the station belongs is fixed, until the disconnection period of time measured by the timer is substantially equal to a period of time determined according to the connection period of time measured by the timer, even after the station is disconnected from the handover suppression apparatus.

Twenty-First Exemplary Embodiment

The communication control module may hold a handover suppressed state wherein a wireless access point to which the station belongs is fixed, even after the station is disconnected from the handover suppression apparatus, according to a reply radio wave from radio wave responder of the handover suppression apparatus, the radio wave responder transmitting, at reception of a radio wave from the station, a reply radio wave in response to the radio wave.

Twenty-Second Exemplary Embodiment

Favorably, the communication control module may hold a handover suppressed state wherein a wireless access point to which the station belongs is fixed, so long as the reply radio wave from the radio wave responder has intensity of radio wave equal to or more than a predetermined threshold value, even after the station is disconnected from the handover suppression apparatus, and releases the handover suppressed state when the intensity of radio wave is less than the threshold value.

Twenty-Third Exemplary Embodiment

It may be desirable that the handover suppression apparatus is connected to the station without using wireless communication as a transmission medium, and transmits the suppression signal via the connection to the station.

Twenty-Fourth Exemplary Embodiment

The communication control method may include the connection detecting step of detecting by the handover suppression apparatus an event in which the station is connected thereto, and the suppression signal transmitting step transmits the suppression signal when connection detecting step detects the connection of the station to the handover suppression apparatus.

Twenty-Fifth Exemplary Embodiment

The suppression signal transmitting step may transmit the suppression signal when an input of handover suppression is received from an input module.

Twenty-Sixth Exemplary Embodiment

Favorably, the communication control method may include the handover suppressed state release step of releasing after the belonging unit fixing step, when the reception of the suppression signal by the station is interrupted, a handover suppressed state wherein a wireless access point to which the station belongs is fixed.

Twenty-Seventh Exemplary Embodiment

The communication control method may further include the connection period measuring step of measuring a connection period of time in which the station is connected to the handover suppression apparatus and the disconnection period measuring step of measuring a disconnection period of time passed after the station is disconnected from the handover suppression apparatus. In this case, the method may desirably include the handover suppressed state holding step of holding after the belonging unit fixing step, a handover suppressed state wherein a wireless access point to which the station belongs is fixed, until the disconnection period of time measured by the disconnection period measuring step is substantially equal to a period of time determined according to the connection period of time measured by the connection period measuring step, even after the station is disconnected from the handover suppression apparatus.

Twenty-Eighth Exemplary Embodiment

The communication control method may include the reply radio wave transmitting step of transmitting from radio wave responder of the handover suppression apparatus, at reception of a radio wave from the station, a reply radio wave in response to the radio wave; the reply radio wave receiving step of receiving the replay radio wave transmitted from the reply radio wave transmitting step, and the state holding step of holding a handover suppressed state wherein a wireless access point to which the station belongs is fixed, according to the reply radio wave received by the reply radio wave receiving step, even after the station is disconnected from the handover suppression apparatus.

Twenty-Ninth Exemplary Embodiment

It may be favorable that the state holding step holds a handover suppressed state wherein a wireless access point to which the station belongs is fixed, so long as the reply radio wave received by the reply radio wave receiving step has intensity of radio wave equal to or more than a predetermined threshold value, even after the station is disconnected from the handover suppression apparatus, and releases the handover suppressed state when the intensity of radio wave is less than the threshold value.

Thirtieth Exemplary Embodiment

The communication control method may favorably include the communication state judge step of determining by the handover suppression apparatus whether the station is wirelessly communicable with wireless access points and the designation signal transmitting step of transmitting, if the communication state judge step determines that the station is wirelessly communicable with wireless access points, an access point designation signal indicating a wireless access point to which the station belongs. The designation signal transmitting step may desirably transmit to the station, the access point designation signal together with the suppression signal produced from the suppression signal transmitting step.

Thirty-First Exemplary Embodiment

It may be favorable that the handover suppression apparatus is connected to the station without using wireless communication as a transmission medium, and transmits the suppression signal via the connection to the station.

Thirty-Second Exemplary Embodiment

The program in the computer-readable medium may cause a computer to perform processing for detecting an event in which the station is connected thereto. The suppression signal transmission processing may transmit the suppression signal when the connection between the station and the handover suppression apparatus is detected.

Thirty-Third Exemplary Embodiment

The program may cause a computer to transmit the suppression signal when an input of handover suppression is received from input module.

Thirty-Fourth Exemplary Embodiment

The program may cause a computer to perform processing for releasing after the belonging unit fixing processing, when the reception of the suppression signal by the station is interrupted, a handover suppressed state wherein a wireless access point to which the station belongs is fixed.

Thirty-Fifth Exemplary Embodiment

The program may cause a computer to perform processing for measuring a connection period of time in which the station is connected to the handover suppression apparatus and disconnection period measuring processing for measuring a disconnection period of time passed after the station is disconnected from the handover suppression apparatus. The program may further cause a computer to perform processing for holding a handover suppressed state wherein a wireless access point to which the station belongs is fixed, until the disconnection period of time is substantially equal to a period of time determined according to the connection period of time, even after the station is disconnected from the handover suppression apparatus.

Thirty-Sixth Exemplary Embodiment

The program may cause a computer to perform processing for transmitting from radio wave responder, at reception of a radio wave from the station, a reply radio wave in response to the radio wave. Favorably, the program causes a computer to perform processing for receiving the replay radio wave and processing for holding a handover suppressed state wherein a wireless access point to which the station belongs is fixed, according to the reply radio wave, even after the station is disconnected from the handover suppression apparatus.

Thirty-Seventh Exemplary Embodiment

The program may cause a computer to bold a handover suppressed state wherein a wireless access point to which the station belongs is fixed, so long as the reply radio wave has intensity of radio wave equal to or more than a predetermined threshold value, even after the station is disconnected from the handover suppression apparatus, and releases the handover suppressed state when the intensity of radio wave is less than the threshold value.

Thirty-Eighth Exemplary Embodiment

The program may cause a computer to perform processing for determining whether the station is wirelessly communicable with wireless access points and processing for transmitting, if the station is wirelessly communicable with wireless access points, an access point designation signal indicating a wireless access point to which the station belongs. In this case, the designation signal transmission processing transmits to the station, the access point designation signal together with the suppression signal.

Thirty-Ninth Exemplary Embodiment

It may be favorable that the handover suppression apparatus is connected to the station without using wireless communication as a transmission medium, and transmits the suppression signal via the connection to the station.

An exemplary advantage according to the invention is that the excessive handover may be suppressed and there are established communications with stable communication quality without demanding an expensive server device and without increasing the wireless communication traffic.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A wireless communication system, comprising:
   a station that conducts wireless communication with a wireless access point; and
   a handover suppression apparatus that is connectable to the station,
   wherein the handover suppression apparatus comprises a suppression signal transmitting unit that transmits a suppression signal to suppress a handover by the station, and
   a radio wave responder unit that transmits, at reception of a radio wave from the station, a reply radio wave in response to the radio wave,
   wherein the station comprises a communication control unit that conducts, upon receipt of the suppression signal, a control operation to fix the wireless access point to which the station belongs, without conducting a handover, wherein the communication control unit holds a handover suppressed state in which the wireless access point to which the station belongs is fixed, according to the reply radio wave, after the station is disconnected from the handover suppression apparatus, wherein the communication control unit holds a handover suppressed state in which the wireless access point to which the station belongs is fixed, so long as the reply radio wave from the radio wave responder unit has an intensity of radio wave equal to or more than a predetermined threshold value, after the station is disconnected from the handover suppression apparatus, and wherein the communication control unit releases the handover suppressed state when the intensity of radio wave is less than the threshold value.

2. The wireless communication system in accordance with claim 1, wherein the handover suppression apparatus comprises a connection detecting unit that detects an event in which the station is connected thereto, and wherein the suppression signal transmitting unit transmits the suppression signal when the connection detecting unit detects the event of the connection of the station to the handover suppression apparatus.

3. The wireless communication system in accordance with claim 1, wherein the handover suppression apparatus comprises an input unit that receives an input, and wherein the suppression signal transmitting unit transmits the suppression signal when an input of handover suppression is received from the input unit.

4. The wireless communication system in accordance with claim 1, wherein the communication control unit releases, when the reception of the suppression signal is interrupted, a handover suppressed state wherein the wireless access point to which the station belongs is fixed.

5. The wireless communication system in accordance with claim 1, wherein the station includes a timer which measures a connection period of time in which the station is connected to the handover suppression apparatus and a disconnection period of time passed after the station is disconnected from the handover suppression apparatus, and wherein the communication control unit holds a handover suppressed state wherein the wireless access point to which the station belongs is fixed, until the disconnection period of time is substantially equal to a period of time determined according to the connection period of time, after the station is disconnected from the handover suppression apparatus.

6. The wireless communication system in accordance with claim 1, wherein the handover suppression apparatus comprises:

a communication state judge unit that determines whether the station is wirelessly communicable with wireless access points; and a designation signal transmitting unit that transmits, if the communication state judge unit determines that the station is wirelessly communicable with wireless access points, an access point designation signal indicating the wireless access point to which the station belongs, wherein the designation signal transmitting unit transmits to the station, the access point designation signal together with the suppression signal.

7. The wireless communication system in accordance with claim 1, wherein the handover suppression apparatus is connectable to the station without using wireless communication as a transmission medium, and wherein the handover suppression apparatus transmits the suppression signal via the connection to the station.

8. The wireless communication system in accordance with claim 1, wherein the handover suppression apparatus comprises a power supply unit for supplying power to the station.

9. A station configured to be connectible to a handover suppression apparatus, the station being capable of conducting wireless communication with a wireless access point, the station comprising:

a communication control unit that conducts, at reception of a suppression signal to suppress a handover from the suppression signal transmitting unit, a control operation to fix the wireless access point to which the station belongs, without conducting a handover, wherein the communication control unit holds a handover suppressed state wherein the wireless access point to which the station belongs is fixed, after the station is disconnected from the handover suppression apparatus, according to a reply radio wave from a radio wave responder unit of the handover suppression apparatus, the radio wave responder unit transmitting, at reception of a radio wave from the station, a reply radio wave in response to the radio wave, wherein the communication control unit holds a handover suppressed state wherein the wireless access point to which the station belongs is fixed, so long as the reply radio wave from the radio wave responder unit has an intensity of radio wave equal to or more than a predetermined threshold value, after the station is disconnected from the handover suppression apparatus, and wherein the communication control unit releases the handover suppressed state when the intensity of radio wave is less than the threshold value.

10. The station in accordance with claim 9, wherein the communication control unit releases, when the reception of the suppression signal is interrupted, a handover suppressed state wherein the wireless access point to which the station belongs is fixed.

11. The station in accordance with claim 9, further comprising:

a timer unit that measures a connection period of time in which the station is connected to the handover suppression apparatus and a disconnection period of time passed after the station is disconnected from the handover suppression apparatus, wherein the communication control unit holds a handover suppressed state wherein the wireless access point to which the station belongs is fixed, until the disconnection period of time is substantially equal to a period of time determined according to the connection period of time, after the station is disconnected from the handover suppression apparatus.

12. A communication control method for use with a wireless communication system comprising a station capable of conducting wireless communication with a wireless access point and a handover suppression apparatus connectable to the station, the method comprising:

suppression signal transmitting comprising transmitting by the handover suppression apparatus a suppression signal to suppress a handover by the station;

belonging unit fixing comprising conducting by the station, at reception of the suppression signal transmitted from the suppression signal transmitting, an operation to fix the wireless access point to which the station belongs, without conducting a handover;

a reply radio wave transmitting comprising transmitting from a radio wave responder of the handover suppression apparatus, at reception of a radio wave from the station, a reply radio wave in response to the radio wave;

a reply radio wave receiving comprising receiving the replay radio wave transmitted from the reply radio wave transmitting step; and a state holding comprising holding a handover suppressed state wherein the wireless access point to which the station belongs is fixed, according to the reply radio wave received by the reply radio wave receiving, even after the station is disconnected from the handover suppression apparatus;

wherein the state holding comprises holding a handover suppressed state wherein the wireless access point to which the station belongs is fixed, so long as the reply radio wave received by the reply radio wave receiving has an intensity of radio wave equal to or more than a predetermined threshold value, even after the station is disconnected from the handover suppression apparatus, and wherein the state holding comprises releasing the handover suppressed state when the intensity of radio wave is less than the threshold value.

13. The communication control method in accordance with claim 12, further comprising:

connection detecting comprising detecting by the handover suppression apparatus an event in which the station is connected thereto, wherein the suppression signal transmitting transmits the suppression signal when the connection detecting detects the event of the connection of the station to the handover suppression apparatus.

14. The communication control method in accordance with claim 12, wherein the suppression signal transmitting transmits the suppression signal when an input of handover suppression is received from an input unit.

15. The communication control method in accordance with claim 12, further comprising:

a handover suppressed state release comprising releasing after the belonging unit fixing step, when the reception of the suppression signal by the station is interrupted, a handover suppressed state wherein the wireless access point to which the station belongs is fixed.

16. The communication control method in accordance with claim 12, comprising:

a connection period measuring comprising measuring a connection period of time in which the station is connected to the handover suppression apparatus;

a disconnection period measuring comprising measuring a disconnection period of time lapsed after the station is disconnected from the handover suppression apparatus; and a handover suppressed state holding comprising holding after the belonging unit fixing step, a handover suppressed state wherein the wireless access point to which the station belongs is fixed, until the disconnection period of time measured by the disconnection period measuring step is substantially equal to a period of time determined according to the connection period of time measured by the connection period measuring step, even after the station is disconnected from the handover suppression apparatus.

17. The communication control method in accordance with claim 12, further comprising:

a communication state judging comprising determining by the handover suppression apparatus whether or not the station is wirelessly communicable with a plurality of wireless access points; and a designation signal transmitting comprising transmitting, if the communication state judge step determines that the station is wirelessly communicable with a plurality of wireless access points, an access point designation signal indicating the wireless access point to which the station belongs, wherein the designation signal transmitting comprises transmitting to the station, the access point designation signal together with the suppression signal produced from the suppression signal transmitting step.

18. The communication control method in accordance with claim 12, wherein the handover suppression apparatus is connectable to the station without using wireless communication as a transmission medium, and wherein the handover suppression apparatus transmits the suppression signal via the connection to the station.

19. A computer-readable medium storing a communication control program for a wireless communication system comprising a station capable of conducting wireless communication with a wireless access point and a handover suppression apparatus connectable to the station, the program, when executed, causing a computer to perform:

processing for transmitting a suppression signal to suppress a handover conducted by the station;

processing for conducting, upon receipt of the suppression signal, an operation to fix the wireless access point to which the station belongs, without conducting a handover;

processing for transmitting from a radio wave responder, upon receipt of a radio wave from the station, a reply radio wave in response to the radio wave;

processing for receiving the reply radio wave; and processing for holding a handover suppressed state in which the wireless access point to which the station belongs is fixed, according to the reply radio wave, even after the station is disconnected from the handover suppression apparatus;

wherein in the processing holding a handover suppressed state, the handover suppressed state wherein the wireless access point to which the station belongs is fixed is held, so long as the reply radio wave has an intensity of radio wave equal to or more than a predetermined threshold value, after the station is disconnected from the handover suppression apparatus, and wherein the handover suppressed state is released when the intensity of radio wave is less than the threshold value.

20. The computer-readable medium in accordance with claim 19, the program further causing a computer to perform:

processing for detecting whether the station established communication with the handover suppression apparatus; and processing for transmitting the suppression signal if the station established communication with the handover suppression apparatus.

21. The computer-readable medium in accordance with claim 19, wherein the suppression signal is transmitted when an input of handover suppression is received from an input unit.

22. The computer-readable medium in accordance with claim 19, the program further causing a computer to perform:

processing for releasing, when the reception of the suppression signal by the station is interrupted, a handover suppressed state in which the wireless access point to which the station belongs is fixed.

23. The computer-readable medium in accordance with claim 19, the program further causing a computer to perform:

processing for measuring a connection period of time in which the station is connected to the handover suppression apparatus;

processing for measuring a disconnection period of time passed after the station is disconnected from the handover suppression apparatus; and processing for holding, a handover suppressed state wherein the wireless access point to which the station belongs is fixed, until the disconnection period of time is substantially equal to a period of time determined according to the connection period of time, after the station is disconnected from the handover suppression apparatus.

24. The computer-readable medium in accordance with claim 19, further causing a computer to perform:

processing for determining whether the station is wirelessly communicable with wireless access points; and processing for transmitting, if the station is wirelessly communicable with wireless access points, an access point designation signal indicating the wireless access point to which the station belongs, wherein the access point designation signal is transmitted together with the suppression signal.

25. The computer-readable medium in accordance with claim 19, wherein the handover suppression apparatus is connectable to the station without using wireless communication as a transmission medium, and wherein the handover suppression apparatus transmits the suppression signal via the connection to the station.

* * * * *